Dec. 27, 1932.     H. T. SEELEY     1,892,540

CONTROL SYSTEM

Filed Dec. 5, 1929

Inventor:
Harold T. Seeley,
by Charles E. Muller
His Attorney.

Patented Dec. 27, 1932

1,892,540

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

CONTROL SYSTEM

Application filed December 5, 1929. Serial No. 411,881.

My invention relates to control systems and particularly to systems for controlling the frequency of an alternating current circuit and one object of my invention is to provide an improved arrangement for controlling the frequency of an alternating current circuit so as to maintain it in synchronism with another alternating current circuit.

In order to prevent the connection of two alternating current circuits, such as an alternator and an alternating current system, from producing large voltage disturbances on the circuit, it is necessary for the voltages of the two circuits to be substantially in phase at the time they are connected together. In accordance with my invention I provide an improved arrangement for controlling the frequency of one of the circuits in response to the phase relation between the voltages of the two circuits so that the frequency of one of the circuits is varied in a manner to maintain the voltages of the circuits substantially in phase.

My invention will be better understood from the following description when taken in connection with the accompanying drawing and its scope will be pointed out in appended claims.

Figure 1:
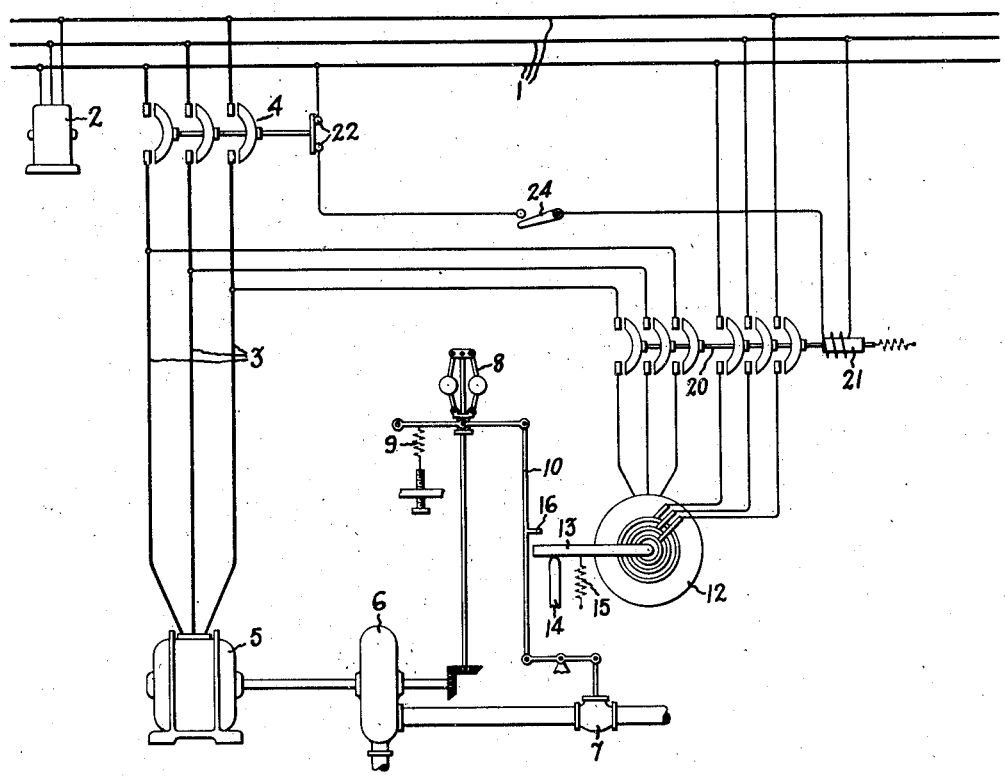
Figure 2:
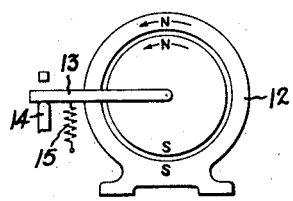

In the accompanying drawing, Fig. 1 shows diagrammatically a frequency control system embodying my invention and Fig. 2 is a diagram shown for the purpose of explaining the operation of the phase responsive device employed in my arrangement.

Referring to Fig. 1 of the accompanying drawing, 1 represents a polyphase circuit which may be a part of an alternating system of distribution supplied by a suitable source of alternating current 2. 3 represents another polyphase circuit which is arranged to be connected to the polyphase circuit 1 by means of a circuit breaker 4 which may be of any suitable type, examples of which are well known in the art. As shown, the polyphase circuit 3 is supplied from a prime mover dynamo electric plant comprising a polyphase alternator 5 driven by a suitable prime mover 6, supplied with operating fluid through a valve or gate 7 which is maintained in a position dependent upon the speed of the prime mover by suitable speed governing means, examples of which are well known in the art. As shown in the drawing, the speed governing means includes a fly-ball governor 8 which operates against the tension of an adjustable spring 9. As shown, the fly-balls 8 are arranged to control the position of the gate 7 by varying the position of a control arm 10 which is connected to suitable operating mechanism for the gate 7. When the speed of the prime mover 6 increases above a predetermined value the fly-balls 8 raise the arm 10 against the force exerted by the spring 9 and operate the operating mechanism of the gate 7 so as to decrease the opening thereof. When the prime mover speed decreases below the predetermined value the spring 9 overcomes the force exerted by the fly-balls 8 and the arm 10 is lowered so that the operating mechanism for the gate 7 is operated in a manner to increase the gate opening. In this manner the speed of the prime mover 6 and the generator 5 is normally maintained substantially constant at a predetermined value which depends upon the adjustment of the spring 9.

Such a governing arrangement, however, usually has a drooping characteristic so that the speed which is held constant under light load conditions is slightly higher than the speed which it holds constant under normal full load conditions. Therefore, whenever the prime mover plant is started up and is in operation with the circuit breaker 4 open, the frequency of the generator 5 is slightly higher than the normal system frequency. Under such conditions therefore it is desirable to decrease the frequency of the generator 5 to a value substantially equal to the system frequency in order to synchronize the generator 5 with the system 1 before the circuit breaker 4 is closed.

In accordance with my invention I provide an arrangement whereby the setting of the speed governor is varied in response to the phase relation between the voltages of the generator 5 and the system 1 so as to bring the generator 5 into synchronism with the system. In the embodiment of my invention shown in the drawing, I accomplish this result by providing a suitable device 12 which, when the frequency of the generator 5 is above the frequency of the line 1, exerts on the arm 10 a force which is in a direction to effect a decrease in the speed of the generator, and which is proportional to the difference in phase between the voltages of the generator 5 and the system 1. As shown, the device 12 is a selsyn motor the stationary and movable windings of which are respectively connected so as to be energized in response to the voltages of the generator 5 and the system 1. An operating arm 13, which is carried by the movable member of the motor 12, is normally held against a suitable stop 14 by means of the spring 15. The movable arm 13, when moved away from the stop 14, is arranged to engage a projection 16 on the arm 10 in such a manner that the force exerted by the arm 13 is in a direction to lower the setting of the governor, that is, it causes the governor to hold a lower speed. Furthermore, the amount the setting is varied depends upon the magnitude of the force exerted on the projection 16 by the arm 13 which in turn depends upon the phase relation between the currents flowing through the windings of the motor 12.

For a better understanding of the operation of the motor 12, attention is called to the diagram shown in Fig. 2. First, let it be assumed that the generator 5 and the system 1 are exactly in synchronism so that the traveling field produced by the current in the stator winding of the motor 12 is exactly in phase with the traveling field produced by the current in the movable winding of the motor. Since both fields are traveling at the same speed and are in phase, no torque is produced on the stator of the motor 12, and therefore the spring 15 maintains the movable arm 13 against the stop 14.

When, however, the frequency of the generator 5 is higher than the frequency of the system 1, the traveling field produced by the current in the stator winding moves faster than the traveling field produced by the current in the rotor winding so that the fields move relatively to each other at a speed equal to the frequency difference and this results in a torque being exerted on the rotor of the motor 12 which varies in direction and magnitude depending upon the relative positions of the two fields. If we assume that the fields travel in a counter-clockwise direction, it will be seen from Fig. 2 that as the stator field moves away from an in-phase position with the rotor field to a position 90° ahead of the rotor field, a gradually increasing torque is exerted on the rotor of the motor in a direction to move the arm 13 in engagement with the projection 16. As the stator field moves from a position 90° ahead of the rotor field to a position 180° ahead, the torque exerted on the rotor is still in a direction to maintain the arm 13 in engagement with the projection 16 but the torque gradually decreases from its maximum value to zero when the fields are 180° apart. As the stator field moves from a position 180° away from the rotor field to a position 90° behind the motor field a gradually increasing torque is exerted on the motor in a direction to move the contact arm 13 into engagement with the stop 14 and the torque exerted against the projection increases as the phase difference decreases until the stator field is 90° behind the rotor field when the torque is a maximum. As the stator field moves from a position 90° behind the rotor field to an in-phase position a torque is still exerted on the rotor in a direction to maintain the arm 13 in engagement with the stop 14 but the magnitude of the torque gradually decreases until it becomes zero when the two fields are in phase.

When the frequency of the generator voltage is lower than the system frequency the field produced by the current in the rotor windings travels faster than the field produced by the current in the stator winding. Therefore, when the fields are moving from an in-phase position to a 180° out-of-phase position, a torque is exerted on the rotor so as to maintain the arm 13 in engagement with the stop 14 and when the fields are moving from a 180° out-of-phase position to an in-phase position a torque is exerted on the rotor in a direction to maintain the stop 13 in engagement with the projection 16.

Therefore, it will be observed that whenever both windings are respectively energized by currents having different frequencies a torque is exerted on the rotor of the motor 12 in one direction during one-half of each cycle of frequency difference and in the opposite direction during the other half cycle. Furthermore, it will be observed that the torque exerted on the rotor is in a direction to lower the governor setting during the one-half cycle after phase coincidence when the generator frequency is higher than the system frequency and during the half cycle before phase coincidence when the generator frequency is lower than the system frequency.

Therefore, when the generator frequency is higher than the system frequency and the voltage of the generator 5 and system 1 move out of phase coincidence, the phase responsive device 12 exerts an increasing force against the projection 16 so that the setting of the governor is changed in a manner to decrease the speed of the prime mover 6 and the generator 5. As the generator frequency decreases, the relative rate of movement of voltages decreases until finally the phase responsive device 12 takes up a position in which the force exerted thereby against the projection 16 is just sufficient to cause the governor to maintain the generator frequency equal to the system frequency and also a predetermined phase relation between the voltages of the generator 5 and the system 1. If the generator frequency starts to increase above the system frequency or the phase difference between the generator and system voltages for any reason starts to increase, the phase responsive device 12 increases the force it exerts against the projection 16 so that the speed of the generator 15 is decreased to restore the desired frequency and phase relation between the generator and system voltages. Similarly, if the generator frequency starts to decrease below the system frequency or the phase difference between the generator and system voltages for any reason starts to decrease, the phase responsive device 12 decreases the force it exerts against the projection 16 so that the speed of the generator 15 is increased to restore the desired frequency and phase relation between the generator and system voltage.

Since the device 12 is arranged to exert a force on the arm 10 in a direction to effect a decrease in the speed of the generator when the generator frequency is below the system frequency, it is evident that if the device 12 were placed in operation when the generator frequency is relatively low the device 12 might prevent the generator from reaching synchronous speed. Therefore, it is essential that the generator frequency be above the system frequency before the phase responsive device 12 is rendered operative to control the setting of the governor. For rendering the device 12 operative I provide a suitable switch 20 which in its closed position connects the stationary and movable windings of the motor 12 respectively across the generator circuit 3 and the system 1.

The switch 20 is provided with a closing coil 21, the circuit of which is arranged to be completed when the switch 4 is open so that its auxiliary contacts 22 are closed and the control switch 24 is closed. While I have shown the control switch 24 as a hand switch in order to simplify the drawing, in actual practice the switch 24 may be controlled in any suitable manner, examples of which are well known in the art, so that it is closed after the generator frequency has increased above the system frequency.

The operation of the arrangement shown in Fig. 1 is as follows: After the prime mover plant has been started and the frequency of the generator 5 is above the frequency of the circuit 1, the switch 24 is closed to effect the closing of the switch 21. The phase responsive device 12 then operates in the manner above described to vary the setting of the governor so as to maintain the frequency of the generator 5 equal to the frequency of the circuit 1 and also in a manner to maintain a predetermined phase relation between the generator and system voltages. After the desired phase and frequency relation has been produced between the generator and system voltages, the switch 4 is closed in any suitable manner examples of which are well known in the art. The opening of the auxiliary contacts 22 on the switch 4 effects the opening of the switch 20 so that modifying effect produced by the phase responsive device 12 is removed from the governor. Consequently the governor adjusts the position of the gate 7 so that the generator then assumes its portion of the load on the system 1.

While I have in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, two disconnected alternating current circuits, and means for controlling the frequency of one of said circuits including regulating means normally set to maintain the frequency of one of said disconnected circuits higher than the frequency of the other circuit, and means dependent upon a predetermined phase relation between the voltages of said circuits for modifying while the normal setting of the regulating means remains unchanged the regulating effect of said regulating means so as to equalize the frequencies of said circuits.

2. In combination, two disconnected alternating current circuits, and means for controlling the frequency of one of said circuits including regulating means normally set to maintain the frequency of one of said disconnected circuits higher than the frequency of the other circuit, and means responsive to a predetermined function of the voltages of said circuits for modifying the regulating effect of said regulating means without changing the normal setting thereof.

In witness whereof I have hereunto set my hand this 27th day of November, 1929.

HAROLD T. SEELEY.